W. J. AND J. W. HUEBNER.
AUTOMOBILE DIRECTION INDICATOR.
APPLICATION FILED FEB. 23, 1918.
1,308,240.
Patented July 1, 1919.
2 SHEETS—SHEET 2.
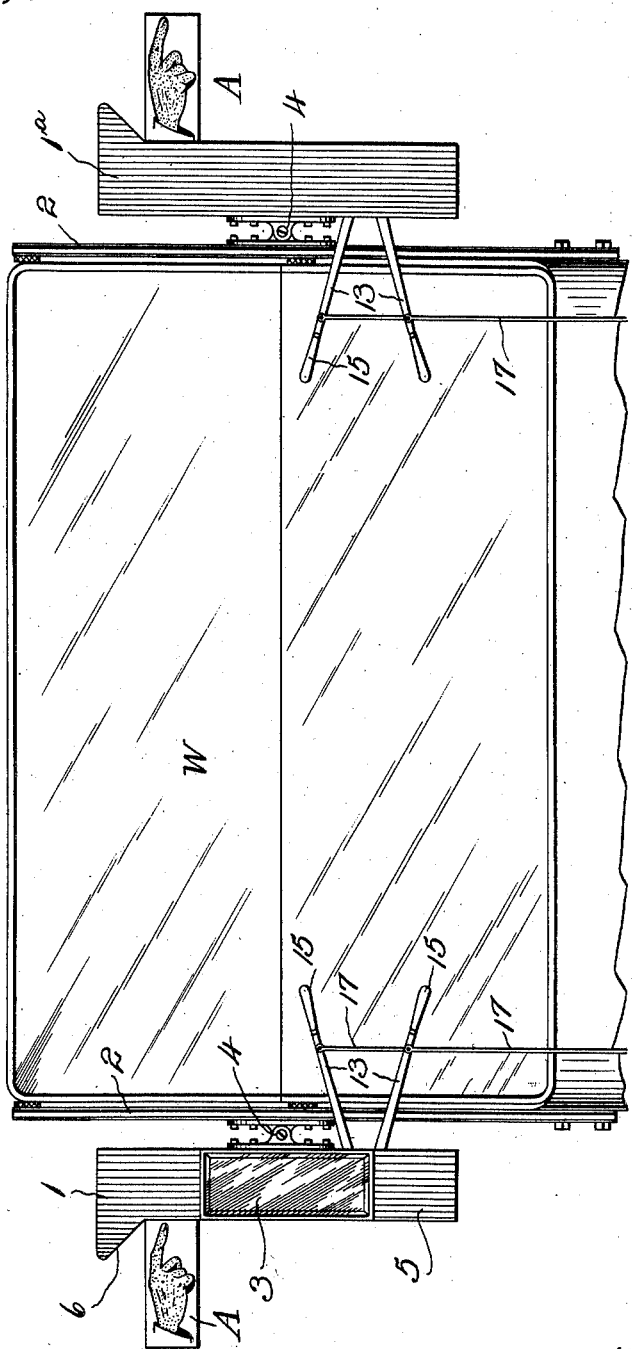

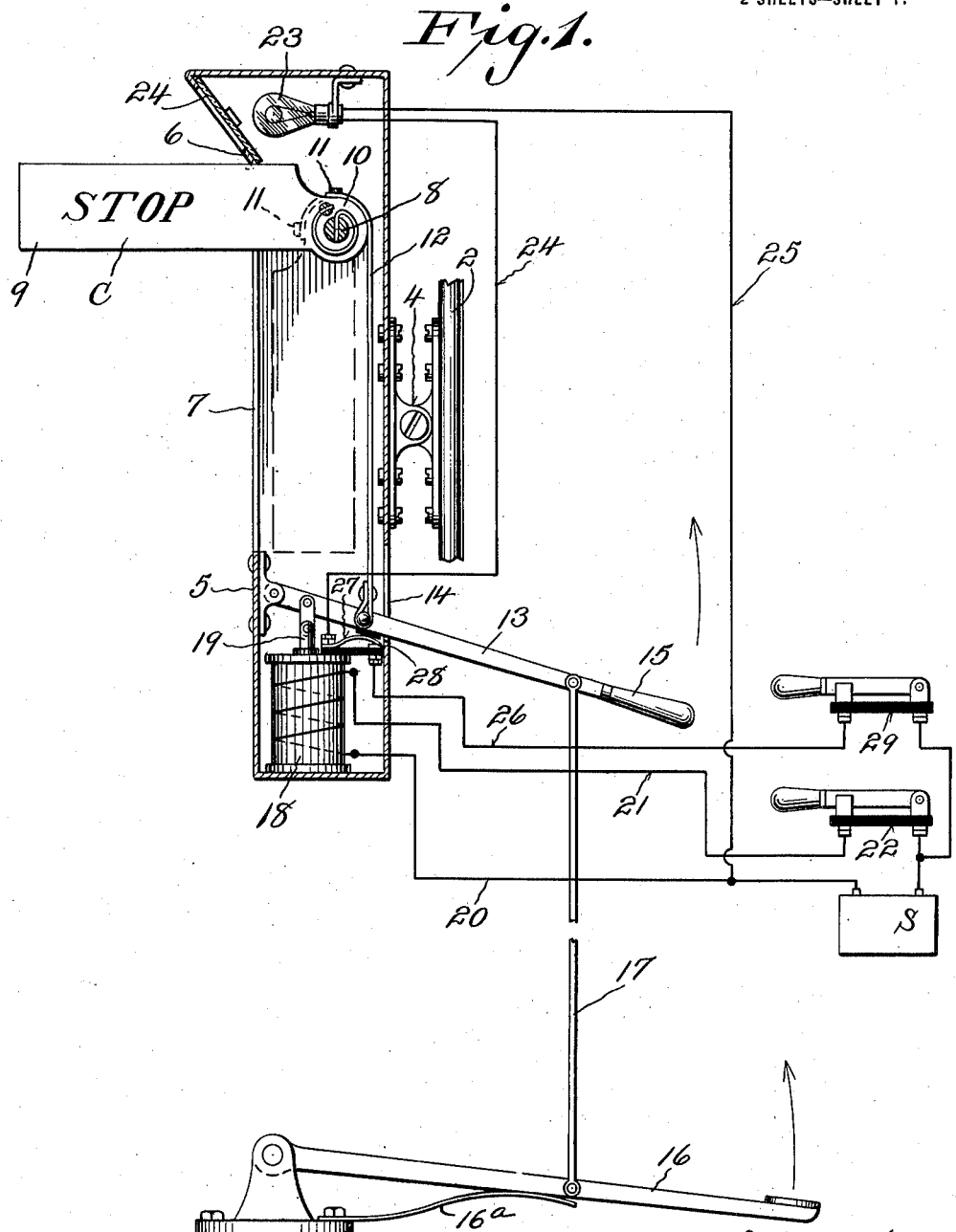

UNITED STATES PATENT OFFICE.

WILLIAM J. HUEBNER AND JOSEPH W. HUEBNER, OF MILWAUKEE, WISCONSIN.

AUTOMOBILE DIRECTION-INDICATOR.

1,308,240.     Specification of Letters Patent.     Patented July 1, 1919.

Application filed February 23, 1918. Serial No. 218,726.

*To all whom it may concern:*

Be it known that we, WILLIAM J. HUEBNER and JOSEPH W. HUEBNER, both citizens of the United States, and residents of Milwaukee, in the county of Milwaukee and State of Wisconsin, have invented certain new and useful Improvements in Automobile Direction-Indicators; and we do hereby declare that the following is a full, clear, and exact description thereof.

Our present invention refers to new and useful improvements in signaling devices, which are adapted to be attached to automobiles and similar vehicles.

It is in general an object of this invention to provide an indicating arrangement which can be seen from both the front and rear of the vehicle on which it is applied and on both sides thereof.

An additional object is to provide an indicator which will have a plurality of signals all of which can be very readily understood by everybody to whom they might apply.

A still further object is to provide illuminating means whereby the signals will be as clearly visible at night as during the daytime.

A further object is to provide efficient means for quickly and accurately operating the signal.

With other minor objects in view the invention resides in the novel features of construction, combination and arrangement of parts, which will be hereinafter more particularly described and claimed, and shown in the drawings, wherein:

Figure 1 represents a semi-diagrammatic view of one part of the signal device constructed in accordance with the present invention.

Fig. 2 is a rear elevational view of a wind shield showing the manner of applying the invention thereto, and Fig. 3 is a disassembled view illustrating a number of signal arms for use in connection with the other parts of the invention.

In the preferred embodiment of our invention, which is shown in the accompanying drawings, it will be noted that the parts thereof are preferably disposed adjacent the front end of an automobile in convenient reach of the operator of the vehicle. The signal arms of the invention are mounted in suitable casings 1 and 1ª which are secured to the opposite supporting posts 2, which hold the two parts of the wind shield W. The casing 1ª is a counterpart of the casing 1 except that the latter has mounted on its rear face a mirror 3 for the purpose of permitting the driver to see objects behind him, and, since these casings are substantially alike, as well as the contents thereof, only the one designated by the numeral 1 will be particularly described in the following description.

Although the casing is preferably adapted to be attached by means of the hinged connection 4 shown in the accompanying drawings, it is obvious that any other arrangement may also be used with equal success. It is desirable, however, to secure the connection 4 substantially midway above the casing and the post 2 to correctly position the signaling device and the mirror 3.

The casing 1 is in the form of a substantially rectangular box of relatively long size disposed vertically and having the upper end of its outer side 5 inclined outwardly and upwardly, as shown at 6; the upper portions of the front and rear sides of the casing are enlarged to coincide with the edges of the inclined portion of the wall 5. The upper portion of the casing thus appears to be overhung, as shown particularly in Fig. 2, and this arrangement, to some extent, protects the wall 5 and prevents water from entering the slot 7 therein.

Disposed within the casing adjacent the upper end of the slot 7, which terminates at the intersection of the inclined and straight portions of side 5, is a stationary rod 8 on which is pivoted five or more signal arms 9, said arms being each substantially rectangular sheet metal plates having an eye formed in one end to receive said rod. Each of the arms 9 bears a different symbol, as shown in Figs. 2 and 3, wherein the reference characters A and B designate signal arms having painted thereon hands which point in opposite directions; C, D, and E show signal arms bearing such legends as "stop", "slow", and "pass", the purpose of which is obvious without further description. Each of the arms bears the same indicating device on both sides so that persons either in front or behind the vehicle will be warned as to the intentions of the driver thereof. The provision of a similar signaling device 1ª on the other side of the wind shield provides indicating means for persons so positioned that they would not normally see the device 1.

Each of the arms 9 has the ear 10 thereof substantially semi-circular, to which part is secured, as at 11, one end of a flexible element such as a cable 12. The other end of this cable extends downwardly at a point adjacent the bottom of the casing where it is secured intermediate the end of a lever 13, which is pivoted to the front wall 5 of the casing, and extends through a slot 14 in the rear wall. The portion of the cable 12 adjacent its connection 11 is adapted to engage the curved portion of the ear 10, as shown in Fig. 1.

The signal arms 9 normally hang downwardly from the rod 9, as shown in dotted lines in Fig. 1, and when in this position each connection 11 between the cable and the ear 10 is disposed at the front or outer edge of its arm so that when the lever 13 is moved downwardly, the latter will swing horizontally and out of the casing, as shown in full lines in Fig. 1. The upward and outward movement of the arms is limited by engagement thereof with the inclined portion 6 of the wall 5. For convenience in operation we have provided several different means for carrying out the movement of the arms from their dotted to their full line position, or from their active to their inactive positions. One of these modes of operation consists in moving the levers 13, one of which is provided for each signal arm, by hand, the free end of said levers having handles 15 thereon for this purpose.

A second means of operation is procured by foot pedals 16, each of which is linked to the lever 13 by rods 17. These foot pedals are normally urged upwardly and the arms consequently swung to retracted position in the casing, by leaf springs 16ª bearing against the end faces of the pedals.

The most efficient means for operating the arms consists, however, in electro-magnets 18, and means for energizing the same. Each of the levers 13 in the casing carries an armature 19, which, although normally spaced from its actuating magnet, is adapted to be drawn into engagement therewith when the same is energized. An individual electro-magnet is preferably used for each of the levers 13, but all are energized from a suitable storage battery S connected thereto by wires 20 and 21. In Fig. 1 the wiring diagram for one electro-magnet 18 is shown, but it is obvious that they all may be suitably connected with the storage battery S. In each circuit leading from the battery S to the magnets 18 is disposed a switch 22, that shown in the drawing being a conventional knife switch, but it is evident that the same may also be an ordinary push button switch.

For permitting the use of the invention at night, illuminating means is provided for the signal arms 9 so that persons may readily read or see the legends thereon. The source of illumination is preferably carried within the upper end of the housing or casing 1, and is supplied by an electric-lamp 23. The rays of light from said lamp are projected through a glass covered opening 24 in the inclined portion 6 of the wall 5 of the casing and on to the signal arms 9 when the same are extended. Since it is only necessary to utilize the source of illumination when the signal arms are in active position, a quick break switch is formed in the circuit of the lamp, which consists of the wires 24, 25, and 26. This switch is mounted in position to be actuated by any one of the arms 13 and it consists of a spring contact 27 and a stationary contact 28, the spring contact being forced into engagement with the latter on downward movement of any one of the levers 13. The circuit between the wires 24 and 26 is thereby completed and the lamp 23 lighted. During daylight hours, the operation of the lamp is suspended by the opening of a switch 29 in its circuit.

From the foregoing description taken in connection with the accompanying drawings, it will be obvious that we have invented a much improved automobile direction indicator, which can be readily installed in practically any automobile. The provision of several operating means overcomes the possibility of the indicator becoming permanently inoperative. In such an arrangement as this on an automobile, all members of the public within sight of the vehicle on which it is used will be clearly warned as to the intentions of the machine long before such intentions materialize.

We claim:—

A signaling device comprising an elongated casing adapted for securement in vertical position to a vehicle and provided with a longitudinal slot in its outer side, a signal arm having one end pivotally mounted in the upper portion of the casing, the said end having a rounded surface, the major portion of the arm being offset outwardly from said end portion in normal suspended position of the signal arm in the casing, a lever pivoted to the outer side of the casing below the slot and extending transversely in the casing, a strap secured to the signal arm and trained about the rounded surface thereof and secured to the lever at the inner side of the casing, an electro-magnet disposed in casing below the lever and an armature for said magnet connected in the lever between the strap and the pivot connection of the lever for swinging said lever to consequently swing the signal arm outwardly of the casing.

In testimony that we claim the foregoing we have hereunto set our hands at Milwaukee, in the county of Milwaukee and State of Wisconsin.

WILLIAM J. HUEBNER.
JOSEPH W. HUEBNER.